June 2, 1959 E. H. OLOFSSON 2,889,459

NEGATIVE FEED-BACK THERMISTOR REGULATED OSCILLATOR

Filed Nov. 29, 1955

INVENTOR
ERIK HERBERT OLOFSSON

BY Hane and Nydick
ATTORNEYS

United States Patent Office 2,889,459

Patented June 2, 1959

2,889,459

NEGATIVE FEED-BACK THERMISTOR REGULATED OSCILLATOR

Erik Herbert Olofsson, Johanneshov, Sweden, assignor to Telefonaktiebolaget L M Ericsson, Stockholm, Sweden, a corporation of Sweden Application November 29, 1955, Serial No. 549,790

Claims priority, application Sweden December 8, 1954

4 Claims. (Cl. 250—36)

The present invention relates to an improvement of the type of oscillators, which are commonly called bridge oscillators.

Such an oscillator may consist of two stages, a grounded grid stage in the anode circuit to which a resonant circuit is connected, and a cathode follower stage. Between the cathodes in those two stages a crystal is connected. The usefulness of such an oscillator is however limited, since it does not always have a sufficiently high frequency stability. In for example multi-channel radio telephone systems oscillators with a considerable frequency stability are required, and it has been found that a usual bridge oscillator does not give a sufficient frequency stability.

In the oscillator according to the present invention the above mentioned drawback has been eliminated by the oscillator being provided with a negative feed-back circuit from a following stage with a negative thermistor in said feedback circuit.

Figure 1:
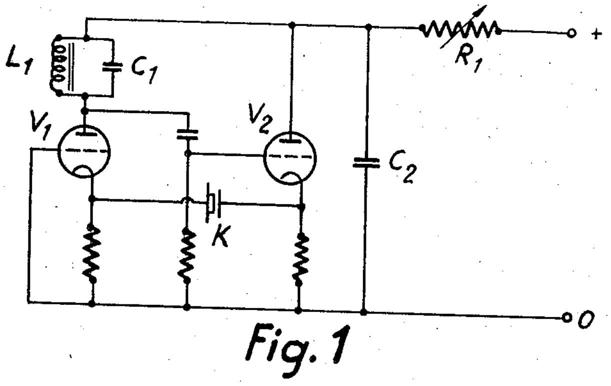

The invention will be described more in detail with reference to the accompanying drawing, in which Fig. 1 shows a known oscillator of the bridge type, Figs. 2 and 3 different embodiments of the oscillator according to the invention.

In Fig. 1, $V_1$ and $V_2$ designate the grounded grid stage and the cathode follower stage, respectively. To the anode of the first mentioned stage is connected a resonant circuit ($L_1$, $C_1$), which is connected to a suitable anode voltage source over an adjustable resistance $R_1$. By suitable adjustment of said resistance the desired grid current can be obtained in the cathode follower. The anode of the stage $V_2$ is grounded over a condenser $C_2$ and the cathodes of the tubes $V_1$ and $V_2$ are interconnected over a crystal K. Such a bridge oscillator may, owing to its structure, principally be compared to an active four-pole having a feed-back path comprising its input impedance and the crystal K, and which begins to oscillate when these elements are suitably dimensioned.

Figure 2:
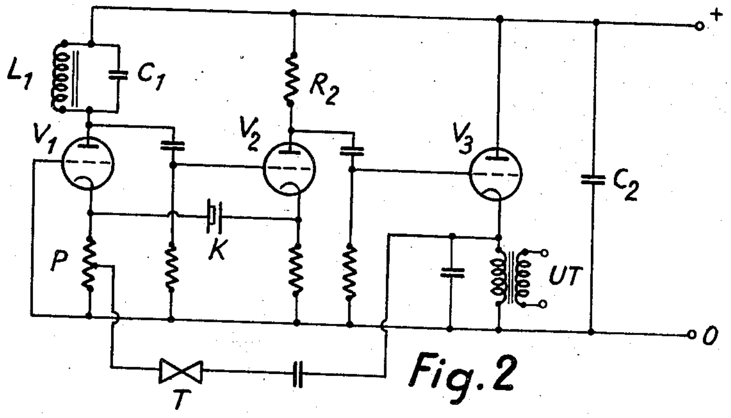

Fig. 2 shows a device according to the invention, the same reference characters as in Fig. 1 being used. $V_1$ and $V_2$ thus designate the grounded grid stage and the cathode follower, respectively, $L_1$, $C_1$ the resonant circuit in the anode circuit of the first mentioned stage and K the crystal which is connected between the cathodes of the tubes $V_1$ and $V_2$. In contradistinction to the system of Fig. 1, a small resistance $R_2$ is connected to the anode of the tube $V_2$ in order to obtain a higher amplification. The anode of the tube $V_2$ is furthermore connected over a coupling condenser to the grid of a further cathode follower $V_3$, the cathode of which is over a negative thermistor T connected to the available contact of a potentiometer P in the cathode circuit of the tube $V_1$. Thus, the oscillator has a feed-back circuit, and a suitable working point for the thermistor can be set by means of the potentiometer. An output transformer UT is also connected to the cathode of the tube $V_3$. As is seen, this arrangement requires an additional tube $V_3$ in comparison with systems in which the oscillator has a feed-back circuit connected to the anode of the tube $V_2$. In such a feed-back circuit, however, the negative thermistor would be connected in parallel with the resistance $R_2$ in the anode circuit of the tube $V_2$. At increased amplification in the tubes $V_1$ and $V_2$, for example by increasing feeding voltage, the higher alternating voltage over the thermistor reduces said resistance, which causes an increased feed back as well as a reduced amplification to the anode of the tube $V_2$ since the thermistor reduces the effective anode resistance. This in its turn entails an adverse effect to the adjustment. When the effective anode resistance decreases, the voltage over the crystal increases, since the attenuation to the cathode of the tube $V_2$ decreases. The experience shows that with the negative thermistors now available the desired compensation of the change of amplification in the crystal circuit cannot be obtained.

By using a third tube $V_3$ of cathode follower type the anode circuit of the tube $V_2$ is unloaded in respect to the thermistor, and since it is the thermistor which determines the voltage amplification, all the tubes in the system will operate with full efficiency. The compensation of the change of amplification in the crystal circuit is very good, and it is possible to keep the current through the crystal constant and very low. Even the change in output voltage becomes very small and the distortion practically negligible (0.1–0.2% distortion).

Figure 3:
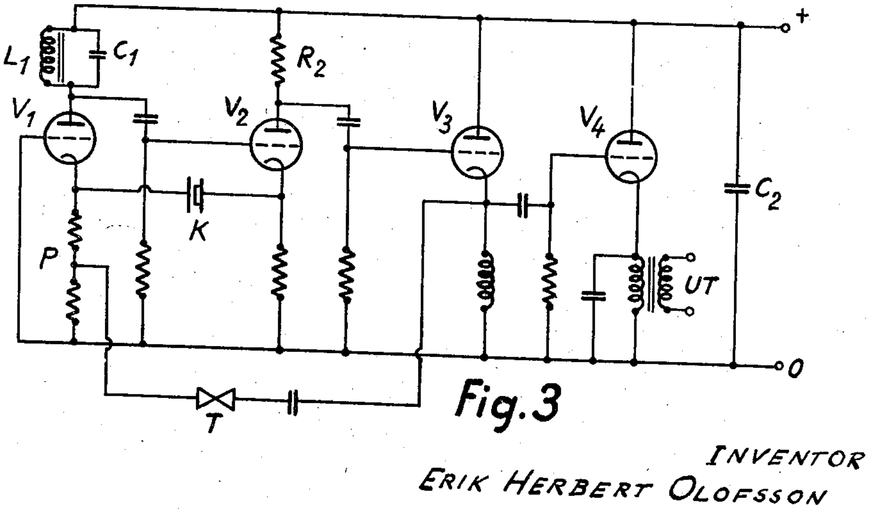

A practical embodiment of the oscillator according to the invention is shown in Fig. 3, the reference characters being the same as before. According to this figure, double triodes are employed, the additional triode, $V_4$ in the example, being used as buffer amplifier.

Thus, in the present invention such an oscillator has been achieved as is practically entirely frequency stable and therefore better than the previously known oscillators of the same type suited for use within those ranges of the teletechnics, where the requirements for high frequency stability are very high.

The invention is naturally not limited to the detail embodiments shown in the figures, but several other oscillator circuits are possible within the scope of the inventive idea.

I claim:

1. A bridge oscillator comprising a first stage including a grounded grid and a cathode circuit, a potentiometer having a variable contact included in said cathode circuit, a cathode-follower second stage connected in circuit with said first stage, a cathode-follower third stage connected in circuit with said second stage, said latter circuit connection including a crystal, and a feed-back circuit including a directly heated negative thermistor, said feed-back circuit being connected between the cathode of the third stage and the cathode circuit of the first stage, said feed-back circuit being connected to the variable contact of said potentiometer for setting the working point of said thermistor.

2. An oscillator according to claim 1, wherein two double triodes are provided, one of said double triodes constituting the first and the second stage, and one of the triodes of the other double triode constituting the third stage, the second triode of said other double triode constituting a buffer amplifier stage.

3. An oscillator according to claim 1, wherein a resistance means is connected to the anode of said second stage to increase the amplification obtained in said stage.

4. A bridge oscillator comprising a first stage including a grounded grid and a cathode circuit, a cathode-follower second stage connected in circuit with said first stage, a cathode-follower third stage connected in circuit with said second stage, said latter circuit connection including a crystal, and a feed-back circuit including a directly heated negative thermistor, said feed-back circuit being connected between the cathode of the third stage and the cathode circuit of the first stage.

References Cited in the file of this patent

UNITED STATES PATENTS

| | | |
|---|---|---|
| 2,586,167 | Kamm | Feb. 19, 1952 |

FOREIGN PATENTS

| | | |
|---|---|---|
| 541,029 | Great Britain | Nov. 10, 1941 |